(12) United States Patent
Vogel et al.

(10) Patent No.: US 7,778,158 B2
(45) Date of Patent: Aug. 17, 2010

(54) METHOD AND APPARATUS OF LOAD SHARING AND IMPROVING FAULT TOLERANCE IN AN INTERACTIVE VIDEO DISTRIBUTION SYSTEM

(75) Inventors: Stephen R. Vogel, Medford, NJ (US); James B. Armstrong, Princeton, NJ (US); Hiep T. Nguyen, San Jose, CA (US)

(73) Assignee: Cox Communications, Inc., Atlanta, GA (US)

( * ) Notice: Subject to any disclaimer, the term of this patent is extended or adjusted under 35 U.S.C. 154(b) by 1690 days.

(21) Appl. No.: 10/930,154

(22) Filed: Aug. 31, 2004

(65) Prior Publication Data
US 2005/0028216 A1    Feb. 3, 2005

Related U.S. Application Data

(62) Division of application No. 09/540,178, filed on Mar. 31, 2000, now Pat. No. 7,487,531.

(60) Provisional application No. 60/170,287, filed on Dec. 10, 1999.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ...................................... 370/217; 370/244
(58) Field of Classification Search .................. None
See application file for complete search history.

(56) References Cited

U.S. PATENT DOCUMENTS 4,413,229 A    11/1983    Grant (Continued)

FOREIGN PATENT DOCUMENTS

EP    0 854 610 A2    7/1998

OTHER PUBLICATIONS

US Statutory Invention Registration H1801—Browning et al—pub. Sep. 7, 1999.*

(Continued)

*Primary Examiner*—Seema S Rao
*Assistant Examiner*—Xavier Szewai Wong
(74) *Attorney, Agent, or Firm*—Merchant & Gould

(57) ABSTRACT

Apparatus and method providing improved fault tolerance through redundancy of hardware and software suitable for use in a head-end of an interactive information distribution system. Communications between each of a head-end controllers and each of the server modules are coincidentally sent along at least two signal paths to provide to additional fault tolerance in the event one of the signal paths becomes inoperable. In one embodiment, a video switch comprises a plurality of I/O ports coupled between a plurality of server modules and a plurality of subscriber equipment for transferring video information between the server and the subscriber equipment. A primary and secondary switch controller are each coupled to the head-end controllers and the plurality of I/O ports. The primary switch controller is used for routing data packets containing said video information between the plurality of I/O ports. The secondary switch controller monitors status of the primary switch controller and I/O ports, and initiates a switchover event in an instance where the primary switch controller exhibits a failure.

9 Claims, 10 Drawing Sheets

U.S. PATENT DOCUMENTS

| | | | |
|---|---|---|---|
| 4,491,968 A | 1/1985 | Shimp et al. | |
| 5,619,641 A | 4/1997 | Ohuchi et al. | |
| 5,652,614 A | 7/1997 | Okabayashi | |
| 5,717,854 A | 2/1998 | Egawa et al. | |
| 5,756,280 A | 5/1998 | Soora et al. | |
| 5,781,530 A * | 7/1998 | Segal | 370/220 |
| 5,845,061 A | 12/1998 | Miyamoto et al. | |
| 5,883,665 A | 3/1999 | Galler et al. | |
| 5,889,775 A | 3/1999 | Sawicz et al. | |
| 5,892,913 A | 4/1999 | Adiga et al. | |
| 5,896,523 A | 4/1999 | Bissett et al. | |
| 5,905,847 A | 5/1999 | Kobayashi et al. | |
| 5,923,361 A | 7/1999 | Sutton, Jr. | |
| 5,946,372 A | 8/1999 | Jones et al. | |
| 5,973,722 A | 10/1999 | Wakai et al. | |
| 5,978,565 A | 11/1999 | Ohran et al. | |
| 5,996,086 A | 11/1999 | Delaney et al. | |
| 6,035,415 A | 3/2000 | Fleming | |
| 6,145,089 A * | 11/2000 | Le et al. | 714/4 |
| 6,381,218 B1 * | 4/2002 | McIntyre et al. | 370/245 |
| 6,412,079 B1 | 6/2002 | Edmonds et al. | |
| 6,415,373 B1 | 7/2002 | Peters et al. | |
| 6,449,250 B1 * | 9/2002 | Otani et al. | 370/219 |
| 6,466,574 B1 | 10/2002 | Fujisaki et al. | |
| 6,578,158 B1 * | 6/2003 | Deitz et al. | 714/11 |
| 2001/0043563 A1 * | 11/2001 | Gerstel et al. | 370/228 |
| 2002/0007492 A1 * | 1/2002 | Smyth et al. | 725/107 |

OTHER PUBLICATIONS

Supplementary European Search Report Corresponding EP00983903.6-1525/US0032943, Apr. 13, 2005.

Supplementary European Search Report Corresponding EP009839036-1525/US0032943, May 24, 2005.

* cited by examiner

METHOD AND APPARATUS OF LOAD SHARING AND IMPROVING FAULT TOLERANCE IN AN INTERACTIVE VIDEO DISTRIBUTION SYSTEM

CROSS REFERENCE TO RELATED APPLICATIONS

This application is a divisional of U.S. patent application Ser. No. 09/540,178, filed on Mar. 31, 2000 now U.S. Pat. No. 7,487,531, which application claims the benefit of U.S. Provisional Application No. 60/170,287, filed on Dec. 10, 1999; both prior applications are hereby incorporated herein by reference in their entireties.

BACKGROUND OF THE INVENTION

1. Field of Invention

The present invention relates to an interactive video distribution system. More particularly, the invention relates to a method and apparatus for increasing the fault tolerance at each of a plurality of head-ends in an interactive video distribution system.

2. Description of the Background Art

Video distribution systems established by a service provider typically utilize a plurality of cable head-ends. A head-end serves as a distribution point for a designated "neighborhood" of subscribers. Subscriber requests for video information such as movies, are made by a subscriber using a remote control device to select from a menu of available titles displayed on a display device. After selection by a subscriber, a request for the selected video information is sent to the local head-end supporting the subscriber.

The requested video information is then transmitted from the head-end to the subscriber for viewing. A typical head-end comprises a video server system that contains subsystems for managing, storing and distributing the video content.

In a system comprising a large number of subscribers, each head-end experiences a substantial level of activity. This typically results in delays in responding to subscriber requests. In addition, data processing and/or transmission errors increase as the demand placed upon the head-end increases. For example, physical hardware errors due to component failures, may result in unacceptable viewing experiences for the subscriber. In some circumstances, a single point of failure may occur that compromises the entire head-end, thereby disrupting video sessions to most, if not all of the subscribers coupled to that particular head-end.

Therefore, it is seen to be desirable to provide more robust head-end functionality within an information distribution system such that delivery of services to subscribers is enhanced. Specifically, it is seen to be desirable to distribute head-end processing functions among a plurality of head-end devices in such a manner as to increase fault tolerance and, ideally, to reduce any single point of failure.

SUMMARY OF INVENTION

The disadvantages heretofore associated with the prior art are overcome by the present invention of an apparatus and method having improved fault tolerance suitable for use in an interactive information distribution system. The apparatus comprises a server having a plurality of server modules coupled to a video switch, and a plurality of head-end controllers, each coupled to each one of the server modules via at least two signal paths. Communications between each of the head-end controllers and each of the server modules are coincidentally sent along at least two signal paths to provide additional fault tolerance in the event one of the signal paths becomes inoperative.

Additionally, the video switch comprises a plurality of I/O ports coupled to the plurality of server modules and a plurality of subscriber equipment. The video switch is capable of transferring video information between the server and the subscriber equipment. A primary and a secondary switch controller are coupled between the head-end controllers and the plurality of I/O ports. The primary switch controller is used for routing data packets containing the video information between the plurality of I/O ports. The secondary switch controller monitors status of the I/O ports and initiates a switch over event in an instance where the primary switch controller exhibits a failure.

A method of providing improved fault tolerance comprises asserting a switch controller READY signal upon completing boot-up at each switch controller, and then performing a self-diagnostic test at each switch controller. Upon passing such self-diagnostic tests, each switch controller asserts a switch controller OK signal, and then the primary switch controller indicates its functionality by asserting a respective ONLINE signal. The secondary switch controller monitors status of the I/O ports and primary switch controller, and initiates a switchover event in an instance where the primary switch controller is determined to be inoperable. The secondary switch controller thereafter serves as the primary switch controller. Thus the apparatus and method advantageously increases the fault tolerance at the head-end through redundancy of hardware and software at a head-end. In this manner, a single point of failure at a head-end of an interactive information distribution system may be averted.

BRIEF DESCRIPTION OF THE DRAWINGS

The teachings of the present invention can be readily understood by considering the following detailed description in conjunction with the accompanying drawings, in which:

FIGS. 1C and 1B together depict a high-level block diagram of a second embodiment of an interactive information distribution system;

To facilitate understanding, identical reference numerals have been used, where possible, to designate identical elements that are common to the figures.

DETAILED DESCRIPTION OF THE INVENTION

Figure 1A:
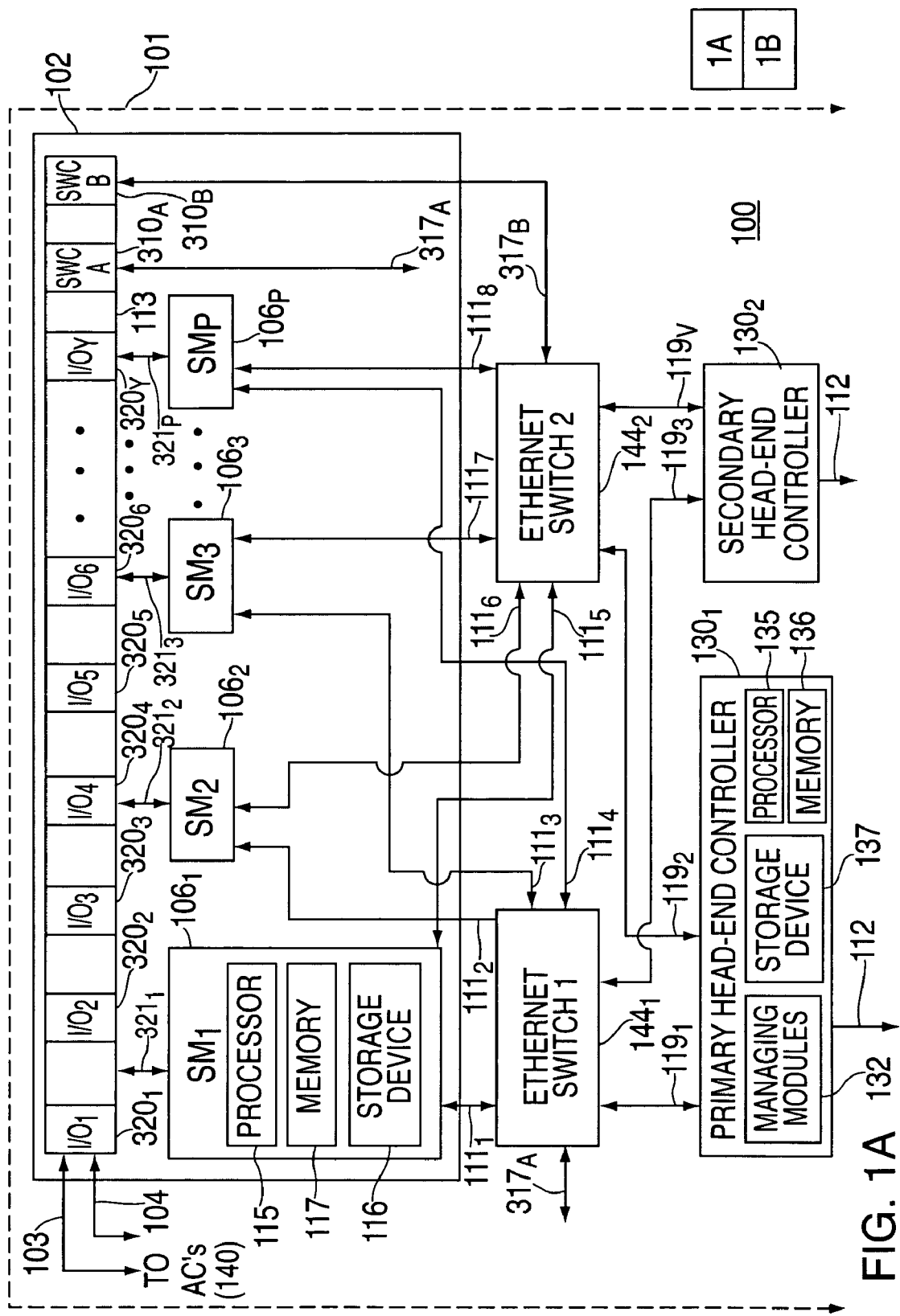
FIGS. 1A and 1B together depict a high-level block diagram of an interactive information distribution system.
Figure 1B:
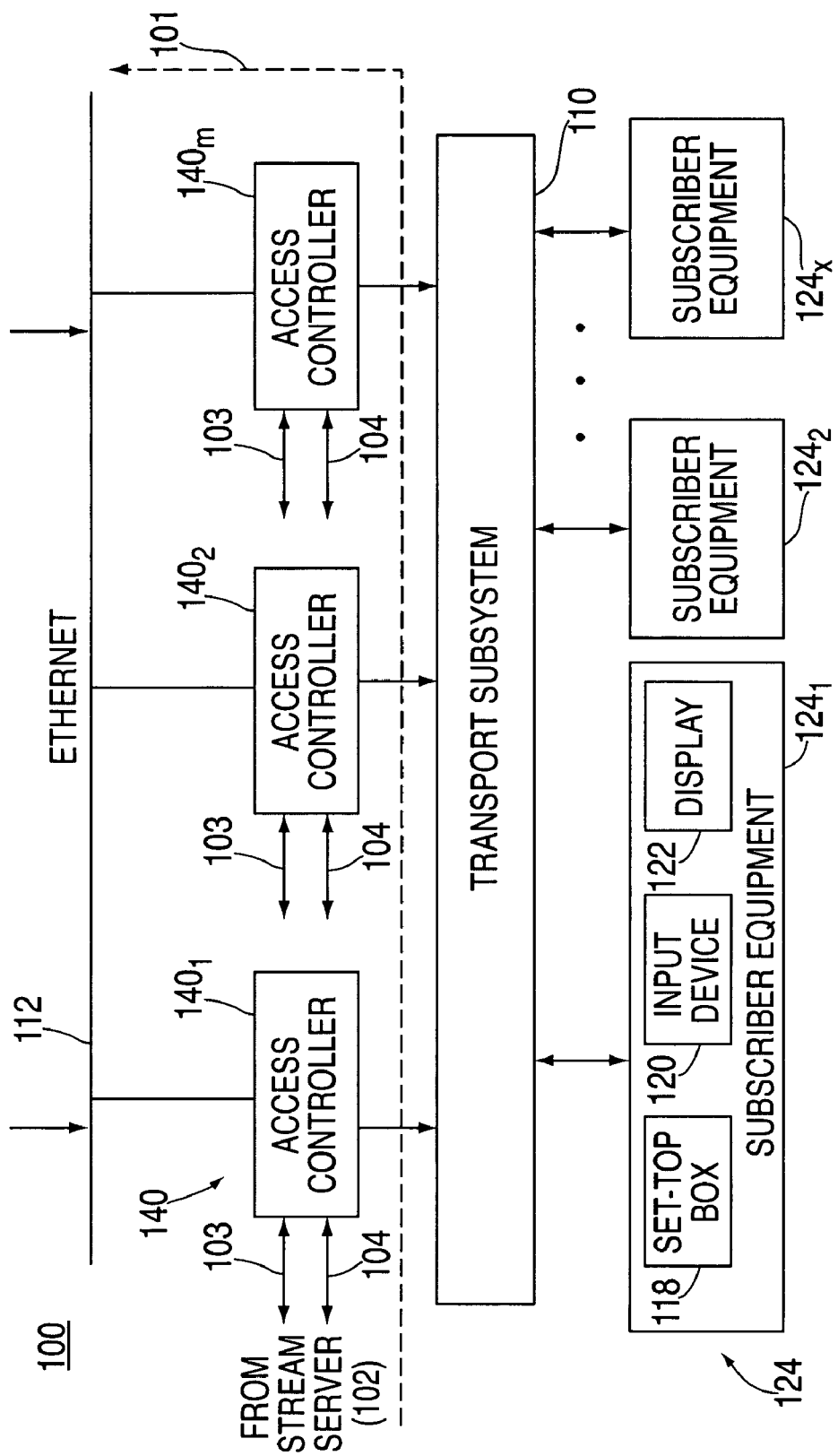

In an interactive information distribution system, duplicate devices are deployed within each head-end of the interactive information distribution system to provide redundancy and thereby diminish the likelihood of a single point of failure. FIGS. 1A and 1B together depict a high-level block diagram of an interactive information distribution system.

The interactive information distribution system 100 of FIGS. 1A and 1B comprises a head-end 101, a transport subsystem or network 110 and subscriber equipment 124. The head-end 101 receives subscriber requests for information such as movies or other content, and responsively provides or "streams" the content in the form of packetized data to the appropriate subscriber equipment 124 via the transport network 110.

A plurality of subscriber equipment 124-1 through 124-$x$ (collectively subscriber equipment 124) each comprise a set-top box (STB) 118, an input device (e.g., remote control) 120 and a display device 122. Communications between the head-end 101 and the subscriber equipment 124 are transmitted across a transport system network 110 by either cable or telephone transport mediums.

The transport network 110 is typically, but not exclusively, a bi-directional, hybrid fiber-coax cable network. Depending upon the fiber node size, one embodiment of the invention utilizes two to five conventional cable channels (e.g., 6 MHz bandwidth channels). Each channel is capable of down streaming up to 10 streams of video information per channel at the same time. Assuming a 10 to 1 concentration, i.e., not all subscribers are viewing at the same time, then approximately 20,000 potential subscribers may be connected to a server 102 at a head-end 101.

A single set top box can be used to receive all the cable services provided by the network. The set top boxes also provide interactive control of the information presentation. The presentation is controlled via the input device 120, e.g., an infrared (IR), radio frequency (RF), or some other remote control unit. The information, e.g., audio, video, still photographs, graphics, and other multimedia programs and the like are portrayed on the display device 122 such as a television, video monitor, stereo system, and the like.

The head-end 101 of the interactive information distribution system 100 comprises a stream server 102, at least two head-end controllers 130-1 and 130-2 (collectively head-end controllers 130), and a plurality of access controllers (AC) 140-1 through 140-$m$ (collectively access controllers 140).

The stream server 102 comprises a plurality of server modules $106_1$ through $106_p$ (collectively server modules 106) coupled to a video switch 113 via signal paths $321_1$ through $321_p$. Each of the server modules 106 comprises at least one processor 115, memory 117, a plurality of storage devices 116, input/output devices and other processing circuitry (not shown) for processing video information. The plurality of storage devices 116 are coupled to each server module 106 of the stream server 102, thereby collectively providing a repository of video assets that are available for request by the subscribers. The plurality of storage devices 116 typically contains thousands of video assets from which the subscriber may choose their programs.

The stream server 102 is coupled to each head-end controller 130 through at least two switches $144_1$ and $144_2$ (collectively switches 144) via signal paths $111_1$ through $111_q$ (collectively signal paths 111) to provide redundant paths for communications of command information between the stream server 102 and each head-end controller 130. In one embodiment of the invention, Ethernet switches 144 and signal paths 111 are utilized. However, it should be understood that a person skilled in the art will appreciate that other types of signal paths 111 and switches 144 (e.g., asynchronous transport mode ATM switching) may be utilized between the stream server 102 and head-end controllers 130.

In particular, each of the server modules 106 is coupled to each Ethernet switch $144_1$ and $144_2$ via two signal paths 111. Furthermore, each head-end controller $130_1$ and $130_2$ is coupled to each Ethernet switch $144_1$ and $144_2$ via signal paths $119_1$ through $119_v$.

For example, the first server module $106_1$ is coupled to the first Ethernet switch $144_1$ via signal path $111_1$ and also coupled to the second Ethernet switch $144_2$ via signal path $111_5$. Similarly, the primary head-end controller $130_1$ is coupled to the first Ethernet switch $144_1$ via signal path $119_1$ and the second Ethernet switch $144_2$ via signal path $119_2$. Thus, the coupling of each server module 106 through the Ethernet switches $144_1$ and $144_2$ in this manner, increases fault tolerance at the head-end 101 by providing redundant communication paths between each server module 106 and head-end controller 130.

The head-end controllers 130 control a video session for a subscriber. In particular, the head-end controllers 130 control the interaction and streaming of video information between the stream server 102 at the head-end 101 and the subscriber equipment 124. The number of head-end controllers 130 is proportional to the number of subscribers being serviced by the system. Each head-end controller can generally service up to 2,500 subscribers. Additional head-end controllers 130 may be added to a head-end 101 as required.

The plurality of access controllers 140 are coupled to each of the head-end controllers 130. This coupling 112 may illustratively be Ethernet or fiber channel cabling. Additionally, each access controller 140 is coupled to the cable transport subsystem 110. The access controllers 140 control the provisioning of video information between the stream server 102 and subscriber equipment 124. A person skilled in the art will understand that other devices capable of transmitting packetized streams of data to and from a set-top box 118 may be utilized. The video stream server 102 is coupled to each access controller 140 via the video switch 113 to provide a plurality of packetized data streams via a signal path 104 and a synchronization clock signal via signal path 103. The packetized data streams contain isochronous information as well as movies or other video assets retrieved from the video content storage device 116.

Figure 2:
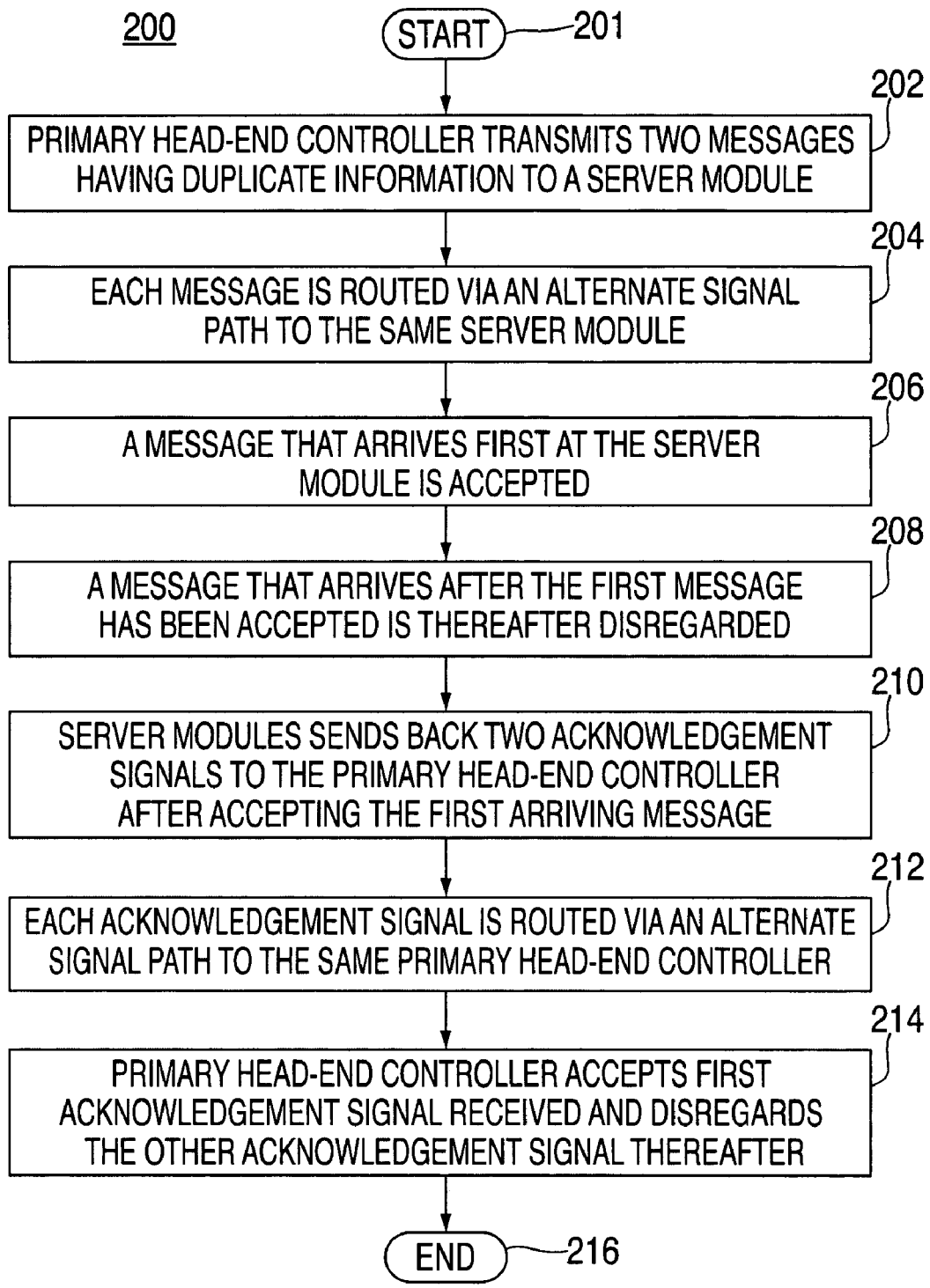
FIG. 2 depicts a flowchart of a first method that facilitates fault tolerance at a head-end of an interactive information distribution system.

The utilization of redundant Ethernet switches 144 and multiple signal paths 111 and 119 between the server modules 106 and head-end controllers 130 diminishes the likelihood of a single point of failure as between each head-end controller 130 and server module 106. FIG. 2 depicts a flowchart of a first method that facilitates fault tolerance at a head-end of an interactive information distribution system. The first method 200 provides alternate routes for communications between the head-end controllers 130 and the stream server 102.

The first method 200 starts at step 201, and proceeds to step 202 where the active (primary) head-end controller sends two messages having the same information to the particular server module containing the video information requested by a subscriber. The head-end controller identifies each message with a tag, which is continually incremented every time a new message is transmitted. In this manner, the head-end controller may track each message and response. In step 204, each message is routed through a different Ethernet switch via a different signal path. Thus, both messages are sent to the same destination, i.e., server module, but through alternate, redundant signal paths.

In step 206, the recipient server module responds to the incoming message from the head-end controller that arrives first, and then in step 208, the second incoming message is ignored by the server module. The first method 200 then proceeds to step 210.

In step 210, the recipient server module sends an acknowledgement message to the head-end controller. In step 212, the server module sends the acknowledgement message along the same signal paths that the incoming message was received. Specifically, two acknowledgement messages are sent. One message is routed through the first Ethernet switch, and the second acknowledgment message is routed through the second Ethernet switch. In step 214, the head-end controller will accept the first acknowledgement message to arrive, and then ignore the second acknowledgement message. In this manner, should one signal path fail between the head-end controller and plurality of server modules, then the redundant signal path (e.g., Ethernet switch) will carry the messages sent between the head-end controller and each server module.

Referring back to FIGS. 1A and 1B, illustratively, when the primary head-end controller $130_1$ communicates with the first server module $106_1$ two messages will be sent. The first message will be sent across signal path $119_1$, through the first Ethernet switch $144_1$, and then to the first server module $106_1$ via signal path $111_1$.

Similarly, the second message will be sent across signal path $119_2$, through the second Ethernet switch $144_2$, and then to the first server module $106_1$ via signal path $111_5$. If either the first Ethernet switch $144_1$, or corresponding signal paths $111_1$ or $119_1$ fail after the primary head-end controller $130_1$ sends the messages, then the message passing through the second Ethernet switch $144_2$ will be received by the first server module $106_1$.

Likewise, the two acknowledgement messages from the first server module $106_1$ are sent back along the same paths through both Ethernet switches 144 and signal paths 111 and 119 to the head-end controller $130_1$. Thus, if a failure occurs on any one signal path or Ethernet switch after the acknowledgment by the server module $106_1$, then the redundant signal path and/or Ethernet switch will prevent a single point system failure during a subscriber session. Referring back to FIG. 2, in step 212, the first method 200 ends, until the next message is sent by the head-end controller, wherein the first method 200 is repeated.

Another aspect of the head-end 101 of the interactive information distribution system 100 that may be susceptible to a single point failure is the video switch 113. A single point failure at a switch controller could result in the termination of any of the video sessions being provided by the stream server 102 to the subscribers. By adding an additional switch controller to the video switch, a single point of failure resulting in video session termination may be abated.

Referring to FIGS. 1A and 1B, the video switch 113 comprises a plurality of switch input/output boards $320_1$ through $320_y$ (collectively I/O ports 320). Coupled to each of the plurality of I/O ports 320 are at least two switch controllers $310_A$ and $310_B$ (hereinafter SWC-A and SWC-B, and collectively switch controllers 310).

In the preferred embodiment, there are two switch controllers 310, where one serves as a primary and the other serves as a secondary switch controller, illustratively $310_A$ and $310_B$, respectively. Furthermore, the server 102 comprises 8 server modules 106 plus the video switch 113, preferably having 16 I/O ports 320. Eight of the I/O ports 320 are used to couple the server modules 106 to the video switch 113 via bi-directional signal paths $321_1$ through $321_p$. Moreover, the remaining eight I/O ports 320 are used to couple the video switch 113 to each of the access controllers 140 via bi-directional signal paths 103 and 104.

The access controllers 140 transmit and receive packetized information to and from the subscriber equipment 124. In this manner, a subscriber may send a request for video information to the head-end 101 and each server module 106 may then stream packetized video information via the switch 113, to the access controllers 140 for further distribution to the subscribers.

Figure 3:
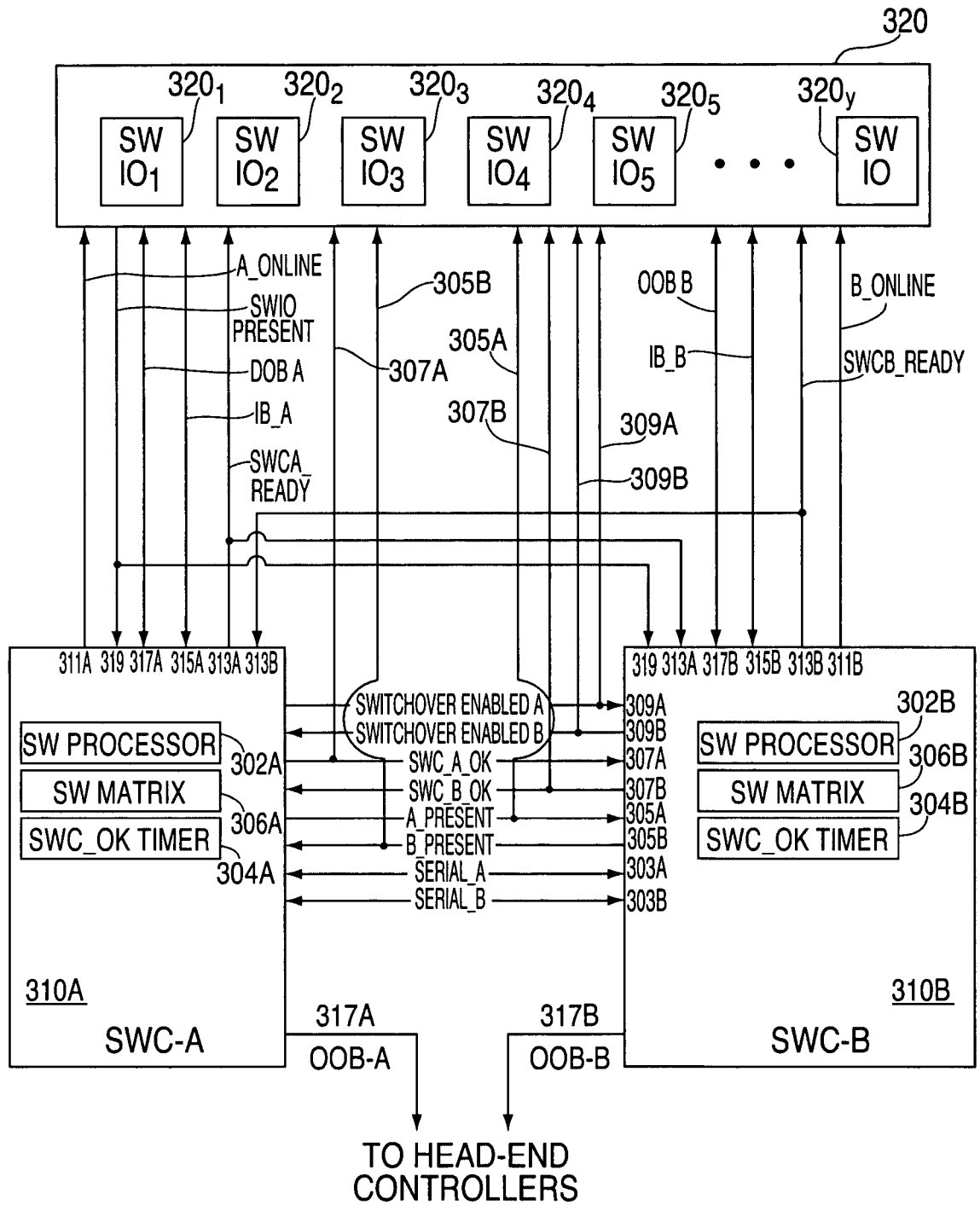
FIG. 3 further depicts a block diagram of a video switch as shown in FIG. 1A.

FIG. 3 further depicts a block diagram of the video switch as shown in FIG. 1. Specifically, in a preferred embodiment, the video switch 113 comprises a switch controller "SWC-A" $310_A$ and a switch controller "SWC-B" $310_B$ (collectively switch controllers 310), where one of the switch controllers 310 serves as a primary switch controller and the other as a secondary switch controller. However, a person skilled in the art will recognize that more than two switch controllers 310 may be utilized.

Each switch controller 310 comprises a switch processor $302_A$ and $302_B$, a switch matrix IC $306_A$ and $306_B$ (collectively switch matrix IC's 306), and a SWC_OK timer $304_A$ and $304_B$. The primary switch controller 310 directs the flow of in-band (IB) information through a plurality of I/O ports $320_1$ through $320_y$ (collectively I/O ports 320) that serve as a routing conduit between the server modules 106 and the plurality of access controllers 140.

Referring back to FIG. 1A, each switch controller 310 is coupled to each head-end controller 130 by way of each Ethernet switch $144_1$ and $144_2$, via signal paths $317_A$ and $317_B$, respectively, and signal paths 119. The switch controllers 310 are coupled to the head-end controllers 130 to exchange communications regarding control information, updating address tables, and providing status of the I/O ports 320. During operation, communications occur between the primary head-end controller 130, and the primary switch controller, e.g., SWC-A $310_A$. The secondary switch controller SWC-B $310_B$ remains idle with regard to the in-band data until switchover occurs, at which time the secondary switch controller assumes the role as the primary switch controller.

For example, messages between the switch controller SWC-A $310_A$ and the primary head-end controller $130_1$ may be sent bi-directionally via signal path $317_A$, through the first Ethernet switch $144_1$, and then through signal path $119_1$. Similarly, messages between the switch controller SWC_B $310_B$ and the primary head-end controller $130_1$ may be sent bi-directionally via signal paths $317_B$, through the second Ethernet switch $144_2$, and then through signal path $119_2$. Likewise, communications between the secondary switch controller SWC-B $310_B$ and the secondary head-end controller $130_2$ may be provided in a similar manner, as shown in FIG. 1.

Referring to FIG. 3, both switch controllers 310 communicate with each other through serial paths SERIAL_A $303_A$ and SERIAL_B $303_B$. In the event the primary switch controller SWC-A $310_A$ becomes inoperative, communications between each of the switch controllers via such SERIAL paths 303 permits the secondary switch controller SWC-B $310_B$ to recognize the non-operation of the primary switch controller $310_A$, and then initiate a switchover event. Thus, redundant signal paths are provided between the head-end controllers 130 and the primary and secondary switch controllers 310.

Figure 1C:
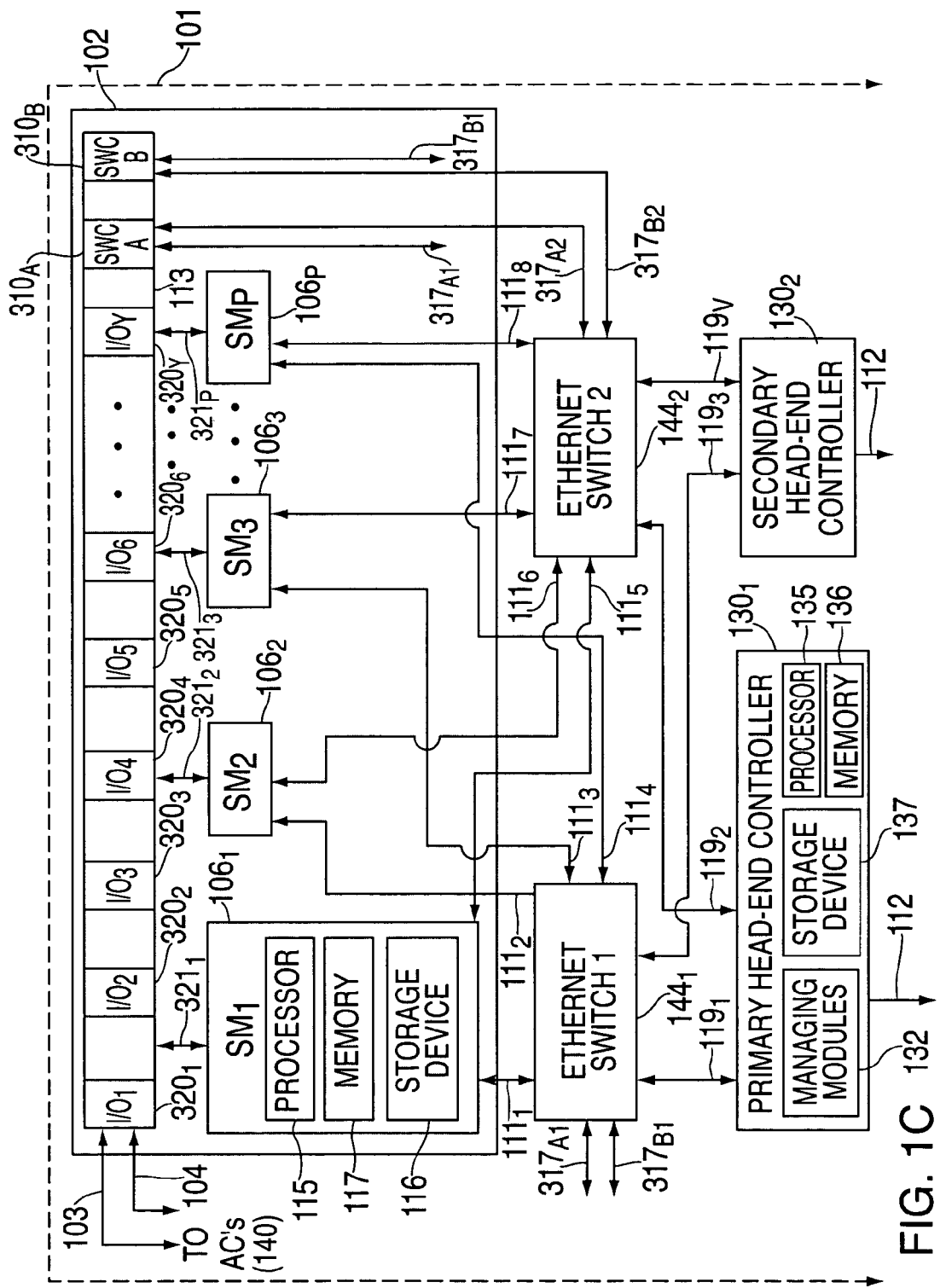

Alternatively, FIGS. 1C and 1B together depict a high-level block diagram of a second embodiment of an interactive information distribution system. In particular, the second embodiment is similar to the first embodiment depicted in FIGS. 1A and 1B together, except for the coupling of the switch controllers 310 to the head-end controllers 130.

Specifically, in FIG. 1C, each switch controller 310 is coupled to each head-end controller 130 by way of each switch $144_1$ and $144_2$, via two pairs of signal paths $317_{A1}$ and $317_{A2}$, and $317_{B1}$ and $317_{B2}$, respectfully, and signal paths 119. The switch controllers 310 are coupled to the head-end controllers 130 to exchange communications regarding control information, updating address tables, and providing status of the I/O ports 320. The secondary switch controller 310 remains idle with regard to the in-band data, until it directs a switchover and assumes the role as the primary switch controller.

For example, messages between the primary head-end controller $130_1$ and the primary switch controller SWC-A $310_A$ are sent via signal paths $119_1$ and $119_2$ to the first and second switches $144_1$ and $144_2$ respectfully, and then through signal paths $317_{A1}$ and $317_{A2}$, respectively. Similarly, communications from the primary switch controller $310_A$ to the primary head-end controller $130_1$ use the same path in the opposite direction. The first message to arrive to the destination is accepted, while the later message is ignored. Likewise, communications between the secondary switch controller $310_B$ are performed in a similar manner. Thus, redundant signal paths are provided between the head-end controllers 130 and the primary and secondary switch controllers 310.

Figure 4:
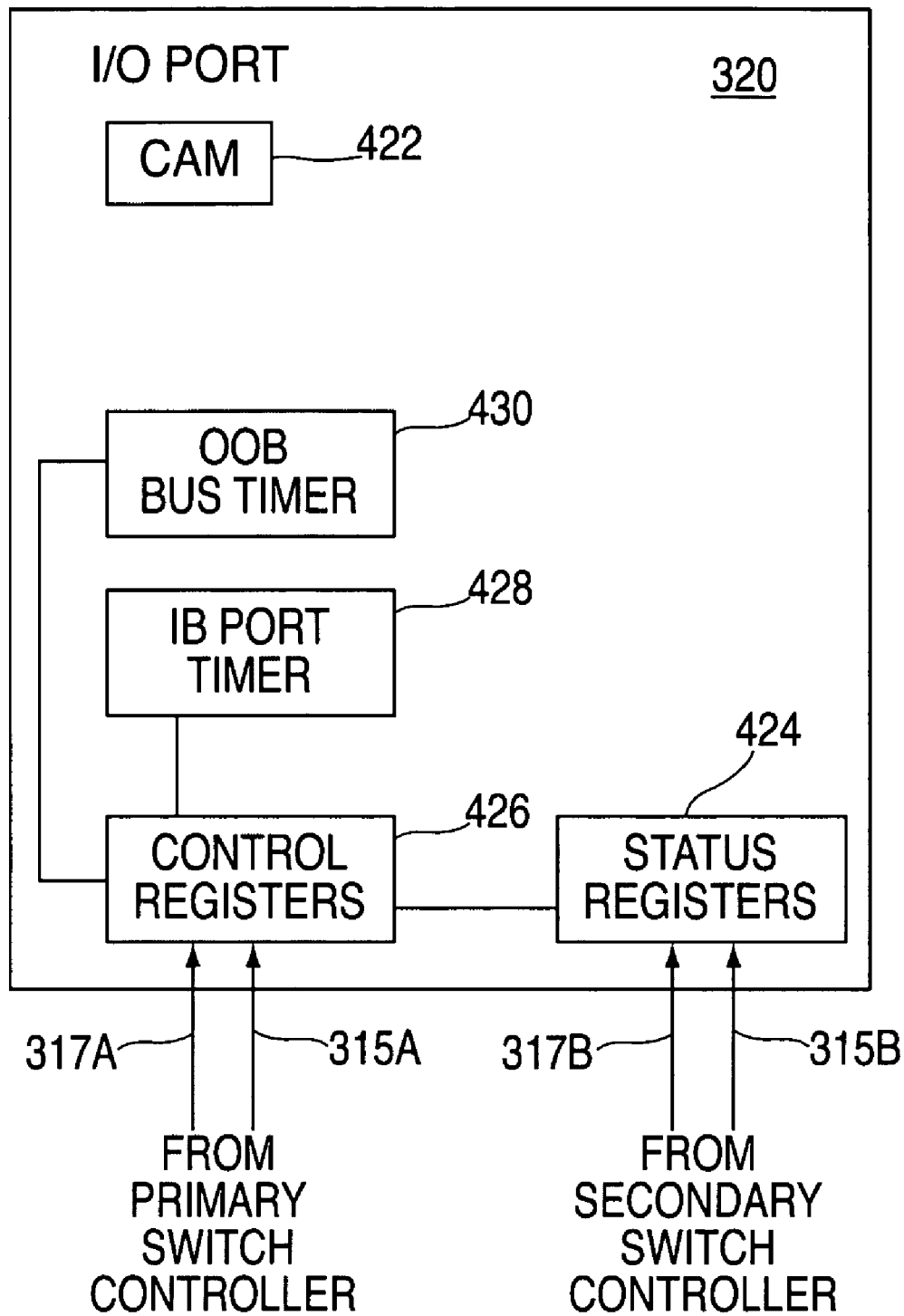
FIG. 4 depicts a block diagram of an I/O port of the video switch.

FIG. 4 depicts a block diagram of an I/O port of the video switch. Specifically, each of the plurality of I/O ports 320 comprises memory 422, i.e., RAM, and a plurality of control registers 426. Furthermore, each of the control registers 426 is coupled to an in-band (IB) port (e.g., watchdog) timer 428, an out-of-band (OOB) bus (e.g., watchdog) timer 430, and at least one status register 424. Both the primary and secondary switch controllers $310_A$ and $310_B$ are coupled to each I/O port 320 via a plurality of IB signal paths $315_A$ and $315_B$ and OOB signal paths $317_A$ and $317_B$.

Figure 7:
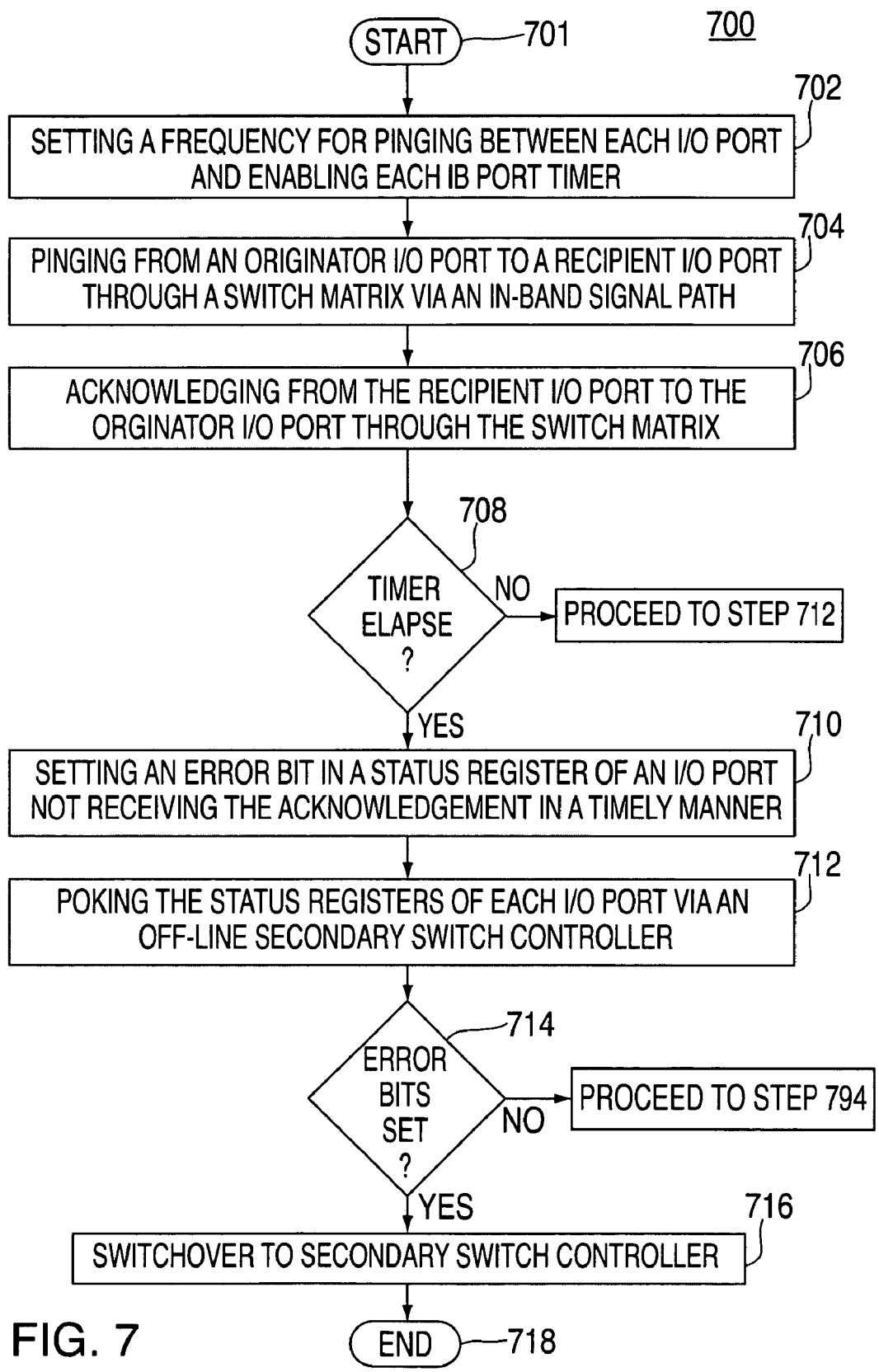
FIG. 7 depicts a flowchart of a method for testing an in-band signal path of a switch.

FIG. 7 depicts a flowchart of method 700 for testing an in-band signal path of a switch. The reader is encouraged to view FIGS. 3 and 4 in conjunction with FIG. 7. The method 700 begins at step 701, and proceeds to step 702 where the plurality of control registers 426 are used to set a frequency of pinging between each of the I/O ports 320 and thereafter enable the IB timer 428.

In step 704, pinging between I/O ports 320 is performed to periodically test in-band (IB) communications between each I/O port 320 via the IB signal paths $315_A$ and $315_B$. A pinging message is illustratively sent from an originating I/O port 1 $320_1$ to the switch matrix $306_A$ of the primary switch controller $310_A$ via signal path IB-A $315_A$. The switch matrix $306_A$ then forwards the pinging message to a second I/O port, e.g., I/O port 2 $320_2$ via the signal path IB-A $315_A$. In step 706, the recipient I/O port 2 $320_2$ then sends an acknowledgement signal back to the originating I/O port 1 $320_1$ via the switch matrix $306_A$ of the primary switch controller $310_A$ over signal path 11B-A $315_A$.

Thus, each of the I/O ports 320 periodically sends out a message to another I/O port 320 and responds with an acknowledgement upon receiving such message. In the preferred embodiment having 16 I/O ports 320, an I/O port 320 pings another I/O port 320, illustratively, every 5 milliseconds. However, a person skilled in the art will appreciate that the IB port timers 428 of the I/O ports 320 may be set to other pinging frequencies as required.

During operation, in an exemplary embodiment I/O port 1 $320_1$ pings I/O port 2 $320_2$ first, then 5 milliseconds later pings I/O port 3 $320_3$, then 5 milliseconds later pings I/O port 4 $320_4$, and continues in this manner through I/O port 16 $320_{16}$ before repeating the cycle, i.e., in a "round robin" process. In addition, the other I/O ports 2 through 16 $320_2$ through $320_{16}$ are likewise pinging one another in a similar manner. Furthermore, a few fractions of a millisecond after each ping is sent, 16 acknowledgements are being sent from the recipient I/O port 320 back to the originating I/O port. Once an I/O port has consecutively pinged the other 15 I/O ports, a cycle has been completed. Thus, during each 5-millisecond interval, 16 individual pings and corresponding acknowledgements are being passed through the switch matrix $306_A$ of the primary switch controller $310_A$. Therefore, during the course of one complete cycle (i.e., 75 milliseconds) the switch matrix $306_A$ functions as a 16×16 array, and will have transferred 240 pings and 240 acknowledgement signals.

The IB port timer 428 is illustratively a watchdog timer. The IB port timer 428 counts time based upon the frequency of pinging, which is set via the control registers 426. Therefore, in this instance, the originator I/O port $1320_1$ has less than the 75 milliseconds to receive such acknowledgement signal before the originator I/O port 1 $320_1$ pings the same recipient I/O port once again.

In step 708, the method 700 determines whether the 13 port timer 428 has elapsed, i.e., whether 75 millisecond cycle elapsed without the originating I/O port 1 $320_1$ receiving the acknowledgement signal. If, in step 708, the IB port timer 428 has not lapsed, then the method 700 proceeds to step 712. If, however, in step 708 the IB port timer 428 has lapsed, then the method proceeds to step 710, where the control registers 426 set a flag, i.e., an error bit in the status registers 424 of the originator I/O port 1 $320_1$.

In step 712, the offline secondary switch controller $310_B$ periodically reads the status registers 424 of each I/O port 320 and then the method 700 proceeds to step 714. In step 714, the method 700 determines whether the in-band signal path 315 is operational between the I/O ports 320. In particular, an absence of any error bits set in the status registers 424 of the respective I/O ports 320 indicates an operational in-band signal path 315. The frequency in which the secondary switch controller $310_B$ periodically reads the status registers 424 of each I/O port 320 is independent of the in band pinging that occurs between the I/O ports 320, and may be set (e.g., every 300 milliseconds) by a systems administrator as desired.

In step 714, the secondary switch controller $310_B$ reads the status registers 424 of the I/O ports 320 to determine if some (e.g., at least two) or all of the I/O ports 320 have asserted an error bit in their respective status registers 424. If the determination is affirmatively answered, the method 700 then proceeds to step 716, where the secondary switch controller $310_B$ assumes the primary switch controller $310_A$ (e.g., switch matrix $306_A$) is inoperable. Thus, in step 716, the secondary switch controller $310_B$ will initiate a switchover and thereby serve as the primary switch controller for the switch 113.

Alternately, if in step 714, if none or only a single I/O port 320 has an error bit set in its respective status register 424, then no switchover will occur. The secondary switch controller $310_B$ treats the single error bit as an aberration instead of a failure flag and instruct the control registers 426 of that particular I/O port 320 to reset the status register. As such, the method proceeds to step 704, and continues to test the in-band signal path $315_A$ between the I/O ports 320. In step 718, the method 700 ends and a redundant method is thereby implemented for confirming that the switch matrix $306_A$ and the in band paths $315_A$ between each I/O port 320 are operational.

Figure 8:
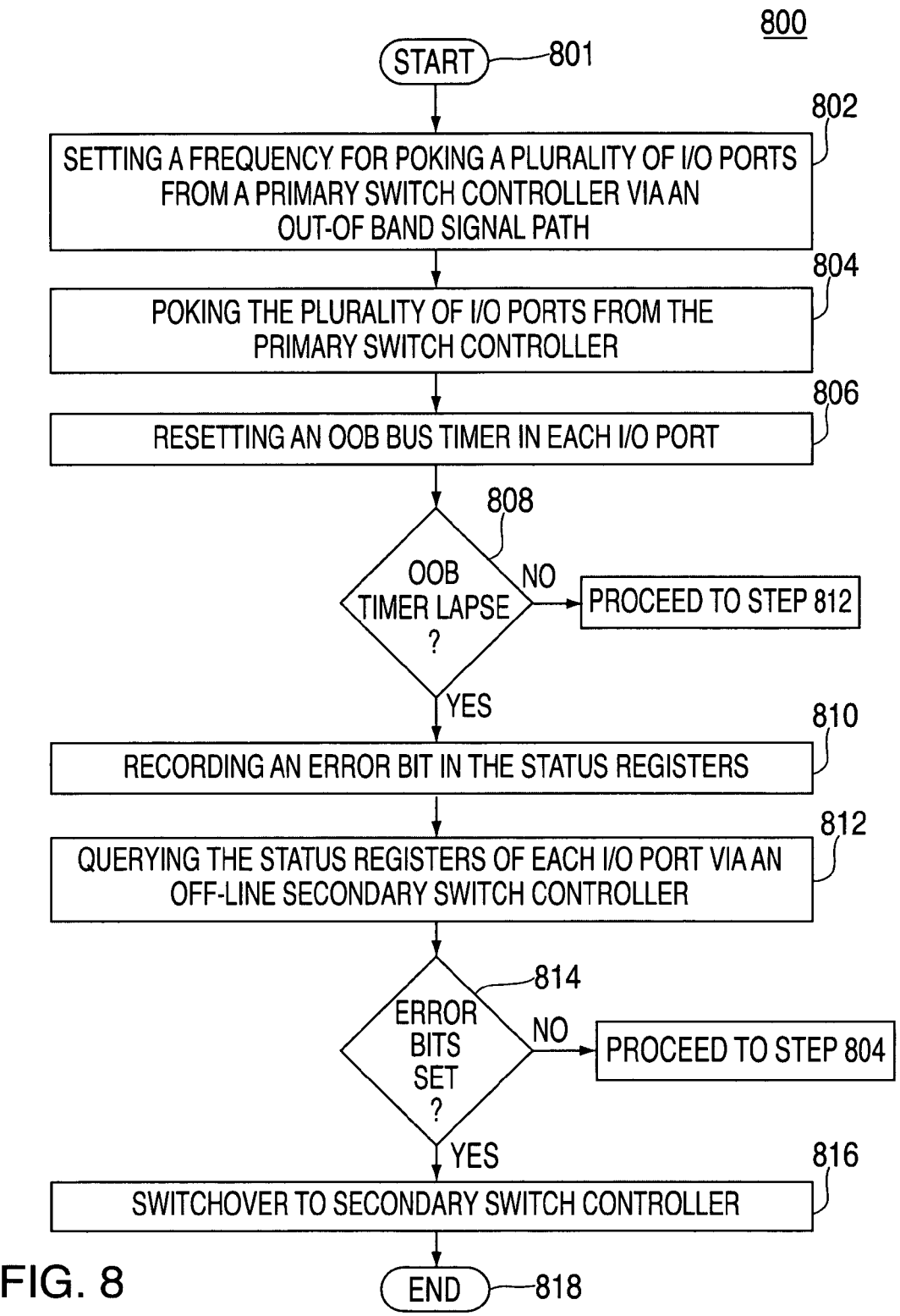
FIG. 8 depicts a flowchart of a method for testing an out-of-band signal path of a switch.

FIG. 8 depicts a flowchart of a method 800 for testing an out-of-band signal path of a switch. The reader is encouraged to view FIGS. 3 and 4 in conjunction with FIG. 8. Fault tolerance of the switch may be improved by periodically testing the out-of-band (OOB) signal path 317 between the primary switch controller $306_A$ and each of the I/O ports 320.

The method 800 begins at step 801, and proceeds to step 802 where the primary switch controller 310$_A$ sets the frequency in which the primary switch controller 310$_A$ pokes the I/O ports 320. In step 804, the primary switch controller 310$_A$ periodically pokes (i.e., reads from or writes to) the I/O ports 320 via the OOB signal path 317. Furthermore, in the preferred embodiment, the primary switch controller 310$_A$ pokes the I/O ports 320 by broadcasting to each of the I/O ports 320 concurrently. However, another embodiment of the invention contemplates that each I/O port 320 may be poked on a consecutive basis, i.e., one at a time.

In step 806, each time the primary switch controller 310$_A$ writes to the control registers 426 of the I/O ports 320, the control registers 426 reset the OOB bus timers 430. Thus, in steps 802 through 806, the primary switch controller 310$_A$ periodically pokes the control registers 426, which in turn resets the OOB bus timer 430.

In step 808, the method 800 queries whether the OOB bus timers have lapsed. If the query of step 808 is negatively answered, i.e., the OOB bus timers 430 have not elapsed or "timed out", then the method 800 proceeds to step 812. If, however, in step 808 the query is affirmatively answered, then a failure has occurred, i.e., the primary switch controller 310$_A$ will have failed to poke the I/O ports 320 over the OOB signal path 317 during the next poking interval. In other words, the OOB bus timers 430 have timed out before the primary switch controller 310$_A$ pokes the I/O ports 320 again. In this instance, the method proceeds to step 810 where the control registers 426 enter an error bit in the status registers 424 of the I/O ports 320 that have not been poked in a timely manner. Since the poking is broadcasted to all of the I/O ports 320 in the preferred embodiment, the status registers 424 in each of the 16 I/O ports 320 will thereby have an error bit set. The method 800 then proceeds to step 812.

In step 812, the offline secondary switch controller 310$_B$ periodically reads the status registers 424 of each I/O port 320, and then the method 800 proceeds to step 814. In step 814, the method 800 determines whether the out-of-band signal path 317$_A$ is operational between the primary switch controller 310$_A$ and the plurality of I/O ports 320, i.e., there are not any error bits set in the status registers 424 of the respective I/O ports 320. The frequency in which the secondary switch controller 310$_B$ periodically reads the status registers 424 of each I/O port 320 is independent of the out-of-band poking that occurs between the primary switch controller 310$_A$ and the plurality of I/O ports 320. Such frequency may be set (e.g., every 300 milliseconds) by a systems administrator as desired.

In step 814, the secondary switch controller 310$_B$ reads the status registers 424 of the I/O ports 320 to determine if some (e.g., at least two) or all of the I/O ports 320 have asserted an error bit in their respective status registers 424. If the determination is affirmatively answered, the method 800 then proceeds to step 816, where the secondary switch controller 310$_B$ assumes the primary switch controller 310$_A$ is inoperable. Thus, in step 816, the secondary switch controller 310$_B$ will initiate a switchover and thereby serve as the primary switch controller for the switch 113.

Alternately, if in step 814, if none or only a single I/O port 320 has an error bit set in its respective status register 424, then no switchover will occur. The secondary switch controller 310$_B$ will treat the single error bit as an aberration instead of a failure flag and instruct the control registers 426 of that particular I/O port 320 to reset the status register. As such, the method proceeds to step 804, and continues to test the out-of-band signal path 317$_A$ between the primary switch controller 310$_A$ and the plurality of I/O ports 320. In step 818 the method 800 ends, and a redundant method is thereby implemented for confirming that the out-of-band paths 317$_A$ between the primary switch controller 310$_A$ and each I/O port 320 are operational.

The switch controllers 310 primarily direct the routing of data packets. The signal paths 103 and 104 stream data packets (video streams) from the I/O ports 320 to the access controllers 140 for further transmittal to a requesting subscriber. To configure the I/O ports 320 for streaming the data packets, the switch controllers 310 are capable of receiving commands from the head-end controller 130.

FIG. 3 further depicts the pair of out-of-band signal paths OOB A 317$_A$ and OOB B 317$_B$ (collectively OOB signal paths 317). The OOB signal paths 317 are used for transferring out-of-band control information, such as switch routing information, health status, I/O port activity, and/or otherwise between the switch controllers 310 and I/O ports 320. The switch 113 stores routing information in memory (hereinafter, Content Addressable Memory (CAM)) 422 of each I/O port 320.

In FIG. 4, the CAM 422 provides a reference table of data packet identifiers and I/O port 320 destination addresses. In particular, the CAM 422 is updated by the primary switch controller 310$_A$, via the out-of-band signal paths 317$_A$, to store a table of the most current destination addresses for the in-band data packets corresponding to each video session. Thus, the CAM 422 table is used for determining which I/O port the in-band data packets are to be routed. Moreover, the switch controllers 310 update the CAM 422 table via the out-of-band signal paths OOB_A 317$_A$ or OOB_B 317$_B$.

A data packet, such as an MPEG data packet, includes a header having a data packet identifier for routing such packet. As the data packets are received by an I/O port 320, the I/O port 320 determines which identifier it has received, and then accesses the CAM 422 table to determine from which I/O port 320 the data packet is destined to be transmitted. Thereafter, the receiving I/O port 320 attaches a header containing the address of the destination I/O port 320 from which the data packet will be streamed to the subscriber.

For example, in FIGS. 1A and 1B, a requesting subscriber who is coupled via the first access controller 140$_1$ to the first I/O port 320$_1$, selects a movie that is stored on the second server module 106$_2$. The MPEG data packets forming such selected movie are distributed from the storage devices 116 on the second server module 106$_2$ to the subscriber via the switch 113. Therefore, the second server module 106$_2$ sends the data packets (streamed video) via signal path 321$_2$ to the fourth I/O port 320$_4$, as illustratively depicted.

The fourth I/O port 320$_4$ determines the I/O port 320 that is responsible for streaming the data packet to the packet destination point, i.e., linked to the requesting subscriber. Upon reception of the data packet, the fourth I/O port 320$_4$ accesses the CAM 322 and determines from the table that the requesting subscriber is coupled to the first I/O port 320$_1$. The I/O port 320$_4$ then attaches a header on each data packet containing the destination address of the appropriate I/O port 320 coupled to the requesting subscriber equipment 124.

The data packet is then sent to the switch matrix IC 306$_A$ via an in-band signal path 315$_A$, for routing to the appropriate I/O port 320, illustratively, the first I/O port 320$_1$. Once the switch matrix IC 306$_A$ receives the data packet, the switch matrix IC 306$_A$ routes the data packet back through the in-band signal path 315$_A$ to the first I/O port 320$_1$. The first I/O port 320$_1$ then removes the header previously attached by the fourth I/O port 320$_4$. Thereafter, the fourth I/O port 320$_4$ streams the remaining MPEG data packets to the respective access controller 140 for subsequent transmission to the subscriber. In this manner, the switch controller 310 controls the routing of data packets to and from the head-end 101 and subscriber equipment 124.

In the event that the switch controller 310 fails, all of the video sessions being executed and streamed to the subscribers would be lost. Therefore, by adding a secondary switch controller 310 to the switch 113, the I/O ports 320 have an alternate switch controller available to provide an alternate in-band signal path 315 between the switch controller 310 and I/O ports 320. Accordingly, if one switch controller fails, then utilizing a redundant switch controller 310 may avert a single point of failure occurring at the switch 113.

Additionally, FIG. 3 depicts a plurality of signal paths from which the switch controllers $310_A$ and $310_B$ communicate with each other and the I/O ports 320. The designations "A" and "B" in a given signal path correspond to the signal paths pertaining to switch controllers SWC-A and SWC-B $310_A$ and $310_B$, respectively.

A plurality of signal paths SWIO_PRESENT 319 are used by each of the plurality of I/O ports 320 to indicate when an I/O port 320 is installed in the switch 113. Specifically, the SWIO_PRESENT signals 319 are broadcast from each I/O port 320 to each switch controller 310. Similarly, A_PRESENT and B_PRESENT signal paths $305_A$ and $305_B$ (collectively PRESENT signal paths 305) provide each switch controller 310 and the plurality of I/O ports 320 a signal to indicate installation and connectivity in the switch 113. Therefore, once each switch controller 310 and I/O port 329 is plugged into their respective slots in a rack (e.g., Compact PCI standard rack), the signals SWIO_PRESENT 319, A_PRESENT $305_A$, and B_PRESENT $305_B$ are asserted and remain in such state unless the device is removed or has an intermittent connection.

Furthermore, bi-directional SERIAL_A and SERIAL_B signal paths $303_A$ and $303_B$ (collectively SERIAL signal paths 303) are coupled between each switch controller 310 and thereby permit the transfer of information between the switch processors 302 of each switch controller SWC-A and SWC-B 310. In particular, the SERIAL signal paths 303 are used by the switch processors $302_A$ and $302_B$ to inform the secondary switch controller when the primary switch controller has updated the CAM 322 table.

Signal paths SWC_A_READY and SWC_B_READY $313_A$ and $313_B$ (collectively SWC_READY signal paths 313) each indicate to the I/O ports 320 and to the other switch controller that the switch controller 310 asserting the SWC_READY signal 313 has finished booting-up. In particular, the SWC_READY signals $313_A$ and $313_B$ are set by each respective switch controller 310 when operational. Similarly, SWC_A_OK and SWC_B_OK signal paths $307_A$ and $307_B$ (collectively SWC_OK signal paths 307) each provide the operational status of the switch controller to the other switch controller 310, as well as the plurality of I/O ports 320.

For instance, if the SWC-A $310_A$ asserts the SWC_A_OK signal $307_A$, then the switch controller SWC-B $310_B$ and the plurality of I/O ports 320 are thereby notified that the SWC-A $310_A$ is functioning properly. In addition, each SWC_OK signal 307 has a hardware timer (e.g., "watchdog timer") $304_A$ and $304_B$ (collectively SWC_OK timers 304) associated with the signal that must be periodically refreshed by software. If the switch processor 302 of the switch controller 310 fails to refresh the signal within a specified time period (illustratively, every half of a millisecond) the switch controller 310 is deemed to have "timed out", and the SWC_OK signal 307 will be de-asserted. This allows an intermittent or failed switch controller 310 to indicate non-operation via the de-assertion of this SWC_OK signal 307.

The plurality of I/O ports 320 are also coupled to each switch controller 310 via a plurality of signal paths. Specifically, A_ONLINE and B_ONLINE signal paths $311_A$ and $311_B$ (collectively ONLINE signal paths 311) are signals respectfully asserted by switch controllers SWC-A and SWC-B 310 when either switch controller 310 thinks it is, or should be, on-line. Furthermore, the ONLINE signal paths 311 are used in conjunction with the SWC_OK and SWC_READY signal paths 307 and 313. Thus, if the SWC_A-OK $307_A$, ONLINE_A $311_A$, and SWC_A_READY $313_A$ signals are asserted by the switch controller SWC-A $310_A$, then the I/O ports 320 may select the switch controller SWC-A $310_A$ as the primary switch controller 310 for routing data packets.

Additionally, the SWITCHOVER ENABLE_A and SWITCHOVER ENABLE_B signal paths $309_A$ and $309_B$ (collectively SWITCHOVER ENABLE signal paths 309) are coupled to each switch controller 310, as well as the plurality of I/O ports 320. The SWITCHOVER ENABLE signal paths 309 are asserted or de-asserted by the off-line secondary switch controller to provide a signal to indicate a switchover event, or prevent further switchovers to the other switch controller 310 by the plurality of I/O ports 320.

Specifically, when the SWITCHOVER ENABLE signal is asserted by the off-line secondary switch controller 310, the primary switch controller and each of the I/O ports 320 are notified that a switchover by the secondary switch controller asserting such signal is available, if required. Conversely, when the SWITCHOVER ENABLE signal 309 is de-asserted by the secondary switch controller 310, the primary switch controller and the I/O ports 320 are notified that a switchover by the secondary switch controller de-asserting such signal may occur if other conditions are satisfied.

Such other conditions may include, illustratively, if the switch controller SWC-A $310_A$ is signaling "on-line" (i.e., the primary switch controller) by asserting the ONLINE_A signal $311_A$, then any change to the SWITCHOVER ENABLE_A signal $309_A$ on the primary switch controller $310_A$ is ignored. Thus, the primary switch controller SWC-A $310_A$ will continue to update to the CAM 322 tables and direct data packet traffic from and to each I/O port 320. Additionally, the secondary switch controller SWC-B $310_B$ will continue to query each of the I/O ports 320 by polling the status registers 324 via the out-of-band OOB_B signal path $317_B$.

However, if the secondary switch controller $310_B$ detects error bits stored in the status registers 324 of at least more than one of the I/O ports 320, then the offline secondary switch controller SWC-B $310_B$ will initiate a switchover. When the secondary switch controller SWC-B $310_B$ de-asserts the SWITCHOVER ENABLE_B signal $309_B$, a switchover will occur if the SWC_B_OK $307_B$, SWC_B_READY $313_B$, and B_ONLINE $311_B$ signals are asserted. Thereafter, the former offline secondary switch controller, SWC-B becomes the online primary switch controller and will provide updates to the CAM 322 tables and direct routing of the in-band data packets.

Another condition, illustratively, is when the SWC_OK timer 304, utilized by the SWC_OK signals 307 of each switch controller 310 and I/O ports 320, elapses during one of the periodic self-diagnostic tests. Thereafter, the SWC_OK signal 307 of such switch controller 310 is de-asserted. In this instance, the switchover to the remaining operable switch controller 310 will occur in a similar manner as illustrated above.

For example, assuming both switch controllers SWC-A $310_A$ and SWC-B $310_B$ are operational, and thereafter, the SWC-A switch controller $310_A$ times out during one of the self-diagnostic tests, then the SWC_A_OK signal $307_A$ is de-asserted by the SWC-A switch controller $310_A$. The SWC-B $310_B$ switch controller then asserts its ONLINE_B signal $311_B$, and subsequently de-asserts the SWITCHOVER ENABLE_B signal $309_B$. Upon the de-assertion transition (e.g., HIGH to LOW transition state) of the SWITCHOVER ENABLE_B signal $309_B$, the switchover to SWC-B $310_B$ occurs. Once a switchover has occurred, no further switchover is possible until corrective action is implemented for the non-operational switch controller SWC-A $310_A$.

Figure 5:
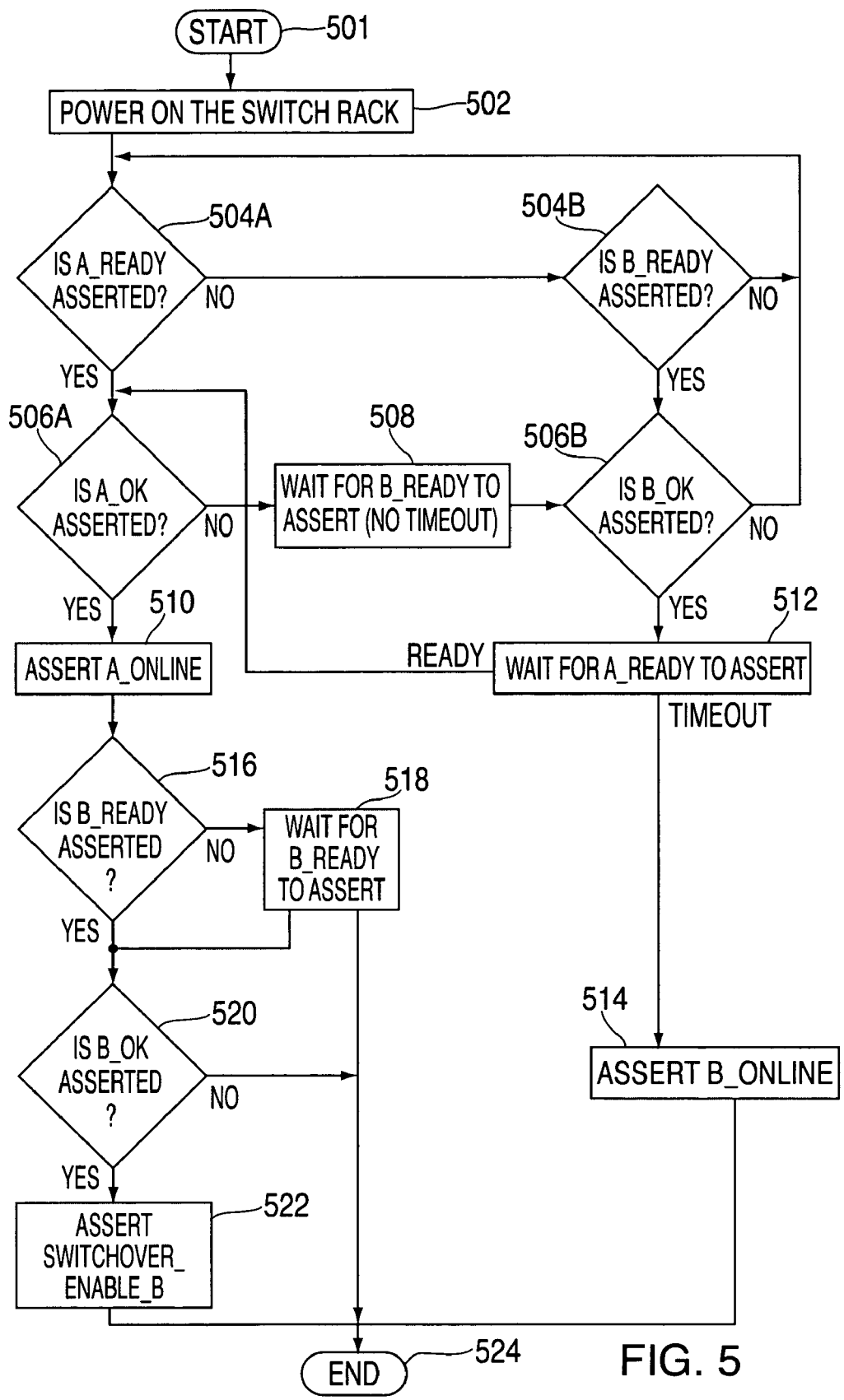
FIG. 5 depicts a flowchart of a second method that facilitates fault tolerance at a head-end of an interactive information distribution system.

FIG. 5 depicts a flowchart of a second method that facilitates fault tolerance at a head-end of an interactive information distribution system. In particular, the second method 500 depicts a method of operation for redundant switch controllers. For the convenience of the reader, method 500 should be viewed in conjunction with FIG. 3.

Method 500 begins at step 501, and proceeds to step 502 where the switch controllers are powered up. In step 504A, the method 500 queries whether the SWC_A_READY signal from the SWC-A switch controller is in an asserted state. Likewise, In step 504B, the method 500 queries whether the SWC_B_READY signal from the SWC-B switch controller is in an asserted state. The SWC_READY signals indicate to the I/O ports and to the other switch controller that each switch controller has completed booting up. In the normal mode of operation, the SWC_READY signals are de-asserted by each switch controller until powered up. Additionally, the SWC-A switch controller is by default, the primary switch controller provided the SWC-A switch controller is operable. Furthermore, and for illustrative purposes herein, the reader is also directed to presume that the SWC-A switch controller is the primary switch controller and the SWC-B switch controller is the secondary switch controller.

If, in steps 504A and 504B, the query is answered negatively, i.e., the SWC_READY signal is not asserted, then the method 500 waits until the boot-up process for both switch controllers SWC-A and SWC-B is complete. If, in steps 504A and 504B, neither the SWC-A nor SWC-B switch controllers assert a SWC_READY signal, then the method 500 goes into a loop until the method 500 "times out". Both switch controllers are deemed non-operational and require corrective action by a system administrator.

If, in step 504A, the query is answered affirmatively, i.e., a SWC_READY signal is asserted for the switch controller SWC-A, then the method 500 proceeds to step 506A. Likewise, If, in step 504B, the query is answered affirmatively, i.e., a SWC_READY signal is asserted for the SWC-B, then the method 500 proceeds to step 506B. In steps 506A and 506B, a query is performed to determine if the switch controllers are operational. The method 500 provides that each switch controller must assert a SWC_OK signal to indicate to the other switch controller and the I/O ports that the switch controller has passed the self-diagnostic tests.

If, in steps 506A, the SWC-A switch controller asserts that it is operational via a SWC_A_OK signal, then, regardless of what the SWC-B switch controller has, or has not asserted in steps 504B and 506B, (i.e., the SWC_B_READY, and/or SWC_B_OK signals), then the SWC-A switch controller proceeds to step 510. In step 510, the SWC-A is by default the primary switch controller and asserts the ONLINE_A signal as such. In this manner, the I/O ports may select the SWC-A switch controller to route the data packets.

Once the switch controller SWC-A has become operational and asserted its respective ONLINE_A signal in step 510, the SWC-A switch controller is available as the primary switch controller for routing data packets, and the method 500 proceeds to step 516. In step 516, the SWC-A switch controller determines if the other switch controller will be available to serve as a secondary switch controller, and as such, whether to enable or disable the switchover function.

Specifically, the method 500 again queries whether the SWC-B switch controller has asserted its respective SWC_B_READY signal. If the query is answered negatively, then the method proceeds to step 518 where the method 500 waits for a specified period set by the watchdog timer for a response. If there is not an assertion of the SWC_B_READY signal in the specified time period, the watchdog timer elapses, and the method 500 proceeds to step 524 where the method 500 ends, and the switchover function for the SWC-B switch controller is disabled.

If, in step 516, the SWC_B_READY signal is asserted by the SWC-B switch controller, then the method proceeds to step 520 where another query is performed. In step 520, the query is performed by the SWC-A switch controller to ascertain if the SWC_B_OK signal has been asserted by the SWC-B switch controller. If the query is answered negatively, the method 500 again proceeds to step 524 where the method 500 ends, and the switchover function for the SWC-B switch controller is disabled.

If, however, in step 520, the SWC_B_OK signal is affirmatively answered, then the method proceeds to step 522, where the SWC-B switch controller asserts the SWITCHOVER ENABLE$_B$ signal. The SWITCHOVER ENABLE_B signal notifies the primary switch controller SWC-A and the I/O ports that the secondary switch controller SWC-B is enabled for a switchover operation, if required. The method 500 then proceeds to step 524 where the method 500 ends.

Referring back to step 506A, if the SWC-A switch controller fails to assert a SWC_A_OK signal, then the method proceeds to step 508. In step 508, the SWC-A switch controller waits for the SWC-B switch controller to assert its respective SWC_B_READY signal. When the SWC-B switch controller asserts its respective SWC_B_READY signal, the method 500 proceeds to step 506B. In step 506B, the self-diagnostics tests are performed. If, in step 506B, the SWC-B switch controller has not passed the self-diagnostic tests, then the SWC-B switch controller has failed and the switch requires corrective action by the system administrator.

However, if in step 506B, the SWC-B switch controller asserts the SWC_B_OK signal, then the method proceeds to step 512. Step 512 may occur only once in method 500. Furthermore, the step 512 is provided in the event that the SWC-A switch controller is operational, but the SWC-B switch controller has asserted its respective SWC_B_READY and SWC_B_OK signals prior to SWC-A completing its respective boot-up and self-diagnostic tests. Thus, in step 512, the SWC-B switch controller checks and waits for the SWC-A switch controller to assert the SWC_A_READY and SWC_A_OK signals as depicted in steps 504A and 506A, before the specified time elapses. Thus, step 512 is performed to allow the SWC-A switch controller to have the opportunity to function as the primary switch controller by default whenever the SWC-A switch controller is operational.

Therefore, in step 512, if the SWC-A switch controller does not assert the SWC_A_READY signal before the watchdog timer of the SWC-B switch controller times out, then the SWC-A switch controller is deemed non-operational. The method 500 then proceeds to step 514. In step 514, the SWC-B switch controller asserts the ONLINE_B signal and the method 500 proceeds to step 524, where the method 500 ends. Thereafter, the SWC-B switch controller assumes the role of the primary switch controller for routing packets of in-band data, and the SWC-A switch controller will require corrective action by the system administrator.

In this manner, the method 500 advantageously utilizes an additional switch controller 310 for increasing fault tolerance at the switch 113. Furthermore, the switch controller 310 is capable of performing self-diagnostic tests to determine operation and status of each switch controller. In the event of a failure, a switchover from the primary switch controller to the secondary switch controller reduces a single point of failure at a switch controller, and thereby allows for continued switch 113 operation during the course of the subscriber video sessions.

Figure 6:
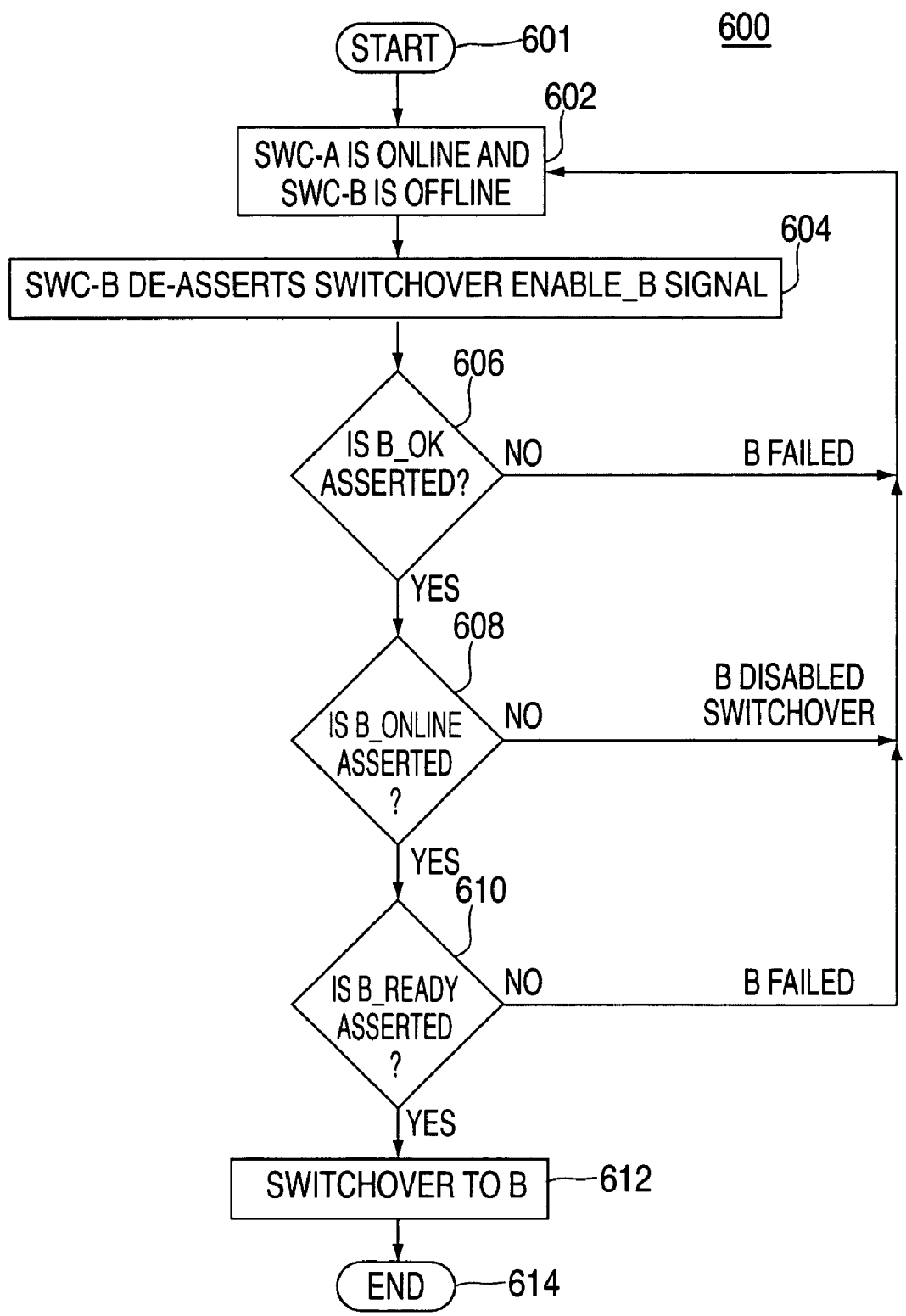
FIG. 6 depicts a flowchart of a method for switchover in the event of a switch controller failure.

FIG. 6 depicts a flowchart of a method of switchover in the event of a switch controller failure. The method 600 begins at step 601 where the "offline" secondary switch controller decides to switchover as the primary switch controller. Switchover may occur in illustratively, instances where the SWC_OK signal expires, or the inter-switch processor serial communications fail between the switch controllers, or the Ethernet communications fail, or the I/O port's out-of-band OOB watchdog timer has expired. In step 602, switch controller SWC-A is, by default, the "online" primary switch controller, and switch controller SWC-B is currently the offline secondary switch controller.

In step 604, the secondary switch controller SWC-B de-asserts the SWITCHOVER ENABLE_B signal coupled to the primary switch controller SWC-A and plurality of I/O ports. The method 600 proceeds to step 606 where a query is performed to determine if the SWC_B_OK signal is asserted. If, in step 606, the query is answered negatively, then the secondary switch controller SWC-B is non-operational, i.e., has failed. The method 600 then proceeds to step 602 where the primary switch controller SWC-A remains online as the primary switch controller and the system administrator is notified of a possible failure of the secondary switch controller.

If, in step 606, the query is answered positively, i.e., the SWC_B_OK signal is asserted by the SWC-B switch controller, then the method 600 proceeds to step 608. In step 608 a second query is performed to determine if the ONLINE_B signal is asserted by the SWC-B secondary switch controller. If, in step 608, the query is answered negatively, then the secondary switch controller SWC-B has disabled the switchover capabilities. The method 600 then proceeds to step 602 where the primary switch controller SWC-A remains online.

If, in step 608, the query is answered positively, i.e., the SWC-B has asserted an ONLINE_B signal, then the method 600 proceeds to step 610. In step 610 a third query is performed to determine if the SWC_B_READY signal is asserted by the SWC-B secondary switch controller. If, in step 610, the query is answered negatively, then the secondary switch controller SWC-B is non-operational, i.e., the secondary switch controller has failed. The method 600 then proceeds to step 602 where the primary switch controller SWC-A remains online and the system administrator is notified of a possible failure of the secondary switch controller.

If, in step 610, the query is answered positively, i.e., the SWC_B_READY signal is asserted by the SWC-B secondary switch controller, then the method 600 proceeds to step 612 where the SWC-B switch controller is switched over to serve as the primary switch controller. In step 614 the method 600 ends and the I/O ports will be primarily controlled via the SWC-B switch controller.

Fault tolerance is achieved by adding redundant signal paths between a plurality of sever modules and head-end controllers. Specifically, a pair of switches interconnect, via two signal paths, each server module to each of the head-end controllers. Furthermore, duplicate messages are each sent along alternate signal paths each time a communication occurs between the head-end controller and server modules, in case one of the signal paths fails. Thus, a single point of failure occurring in the communications paths between the head-end controllers and plurality of server modules has been averted.

In a similar manner, fault tolerance has been improved at the video switch. Specifically, a secondary switch controller has been provided to monitor the state of the I/O ports, as well as the primary switch controller. In the event of a failure, the secondary switch controller may initiate a switchover to serve as the primary switch controller, and thereby continue the routing of data packets during a video session. Thus, a single point of failure occurring in the video switch has been averted. Although various embodiments that incorporate the teachings of the present invention have been shown and described in detail herein, those skilled in the art can readily devise many other varied embodiments that still incorporate these teachings.

What is claimed is:

1. In a video distribution system having provider equipment including a head-end, and associated subscriber equipment, a method of improving fault tolerance at a video switch, said method comprising the steps of:

initializing a plurality of switch controllers coupled to each of a plurality of headend controllers by a plurality of switches controlled by the plurality of switch controllers;

asserting a switch controller READY signal at each of a plurality of switch controllers coupled to said video switch at said head-end to indicate operational status of each of the plurality of switch controllers;

performing self-diagnostic tests on each of the plurality of switch controllers by testing communication between each of a plurality of I/O ports through each of the plurality of switch controllers;

asserting a switch controller OK signal upon passing said self-diagnostic tests at each of said switch controllers;

indicating primary switch controller functionality by asserting a respective ONLINE signal by one of said plurality of switch controllers;

indicating secondary switch controller functionality by de-asserting a respective switch controller ONLINE signal;

monitoring the plurality of I/O ports and the primary switch controller by the secondary switch controller; and initiating a switchover event when said secondary switch controller determines during the monitoring of the plurality of I/O ports and the primary switch controller that the primary switch controller is inoperable.

2. The method of claim 1, comprising the steps of:

periodically performing said self-diagnostic tests at said primary and secondary switch controllers;

initiating said switch controller OK signal after each periodic self-diagnostic test prior to a timer elapsing; and de-asserting said switch controller OK signal when said primary or secondary switch controller fails to pass said self-diagnostic tests prior to said timer elapsing.

3. The method of claim 2, comprising the step of:

asserting said ONLINE signal by one of said plurality of switch controllers in a default mode of operation to cause said plurality of switch controllers to serve as an acting primary switch controller.

4. In a video distribution system having provider equipment and associated subscriber equipment, a method of improving fault tolerance at a video switch comprising a plurality of I/O ports and a plurality of switch controllers for providing content from said provider equipment to said subscriber equipment, said method comprising the steps of:
- a) initializing a plurality of switch controllers coupled to each of a plurality of headend controllers by a plurality of switches controlled by the plurality of switch controllers, the plurality of switch controllers including a primary switch controller and a secondary switch controller;
- b) sending a periodic pinging command from an origination I/O port to a destination I/O port of said plurality of I/O ports via the primary switch controller of said video switch for testing a switch matrix of said primary switch controller;
- c) setting a timer of said origination I/O port upon sending said periodic pinging command;
- d) sending an acknowledgement signal from said destination I/O port to said origination I/O port via said switch matrix of said primary switch controller;
- e) monitoring by the secondary switch controller a status of the primary switch controller and a status register in said origination I/O port;
- f) resetting said timer by the secondary switch controller in an instance that said timer of said origination I/O port elapses before said switch matrix of said primary switch controller sends said acknowledgement to said origination I/O port;
- g) repeating steps (b-f) for each of said I/O ports of said plurality of I/O ports so that each I/O port alternately serves as an origination I/O port and a destination I/O port; and
- h) initiating a switchover event when said secondary switch controller determines during the monitoring of the status of the primary switch controller and the status register of each of said I/O ports of said plurality of I/O ports that the primary switch controller is inoperable.

5. The method of claim 4 further comprising the step of:
initiating the switchover event when at least two of said plurality of I/O ports fail to receive said acknowledgment signals prior to their respective timers lapsing to cause said secondary switch controller to serve as said primary switch controller.

6. In a video distribution system having provider equipment and associated subscriber equipment, a method of improving fault tolerance at a video switch comprising a plurality of I/O ports and a plurality of switch controllers for providing content from said provider equipment to said subscriber equipment, said method comprising the steps of:
initializing a plurality of switch controllers coupled to each of a plurality of headend controllers by a plurality of switches controlled by the plurality of switch controllers, the plurality of switch controllers including a primary switch controller and a secondary switch controller
sending a periodic polling command to a control register in each of said plurality of I/O ports via the primary switch controller of said plurality of switch controllers;
setting a timer in each said I/O port via said control register upon receiving a respective periodic polling command;
monitoring by the secondary switch controller a status of the primary switch controller and a status register in each said I/O port;
setting an error message in the status register of an I/O port of said plurality of I/O ports when a respective timer of said I/O port elapses before an associated control register resets said timer from a next polling command; and
initiating a switchover event when said secondary switch controller determines during the monitoring of the status of the primary switch controller and the status register of each of said I/O ports of said plurality of I/O ports that the error message indicates that the primary switch controller is inoperable.

7. The method of claim 6 comprising the step of:
initiating the switchover event when a plurality of status registers in a plurality of I/O ports have said error messages set in said status registers to cause said secondary switch controller to serve as said primary switch controller.

8. The method of claim 6 comprising the step of broadcasting said polling command to a plurality of said I/O ports simultaneously.

9. The method of claim 6 comprising the step of pointcasting said polling command to a plurality of said I/O ports consecutively.

* * * * *

UNITED STATES PATENT AND TRADEMARK OFFICE
CERTIFICATE OF CORRECTION

| | | |
|---|---|---|
| PATENT NO. | : 7,778,158 B2 | Page 1 of 1 |
| APPLICATION NO. | : 10/930154 | |
| DATED | : August 17, 2010 | |
| INVENTOR(S) | : Vogel et al. | |

It is certified that error appears in the above-identified patent and that said Letters Patent is hereby corrected as shown below:

Col. 8, line 16: "port 1320, has less" should read --port 1 $320_J$ has less--

Col. 8, line 20: "whether the 13 port" should read --whether the IB port--

Signed and Sealed this
Twenty-fifth Day of January, 2011

David J. Kappos
*Director of the United States Patent and Trademark Office*